Figure 1:
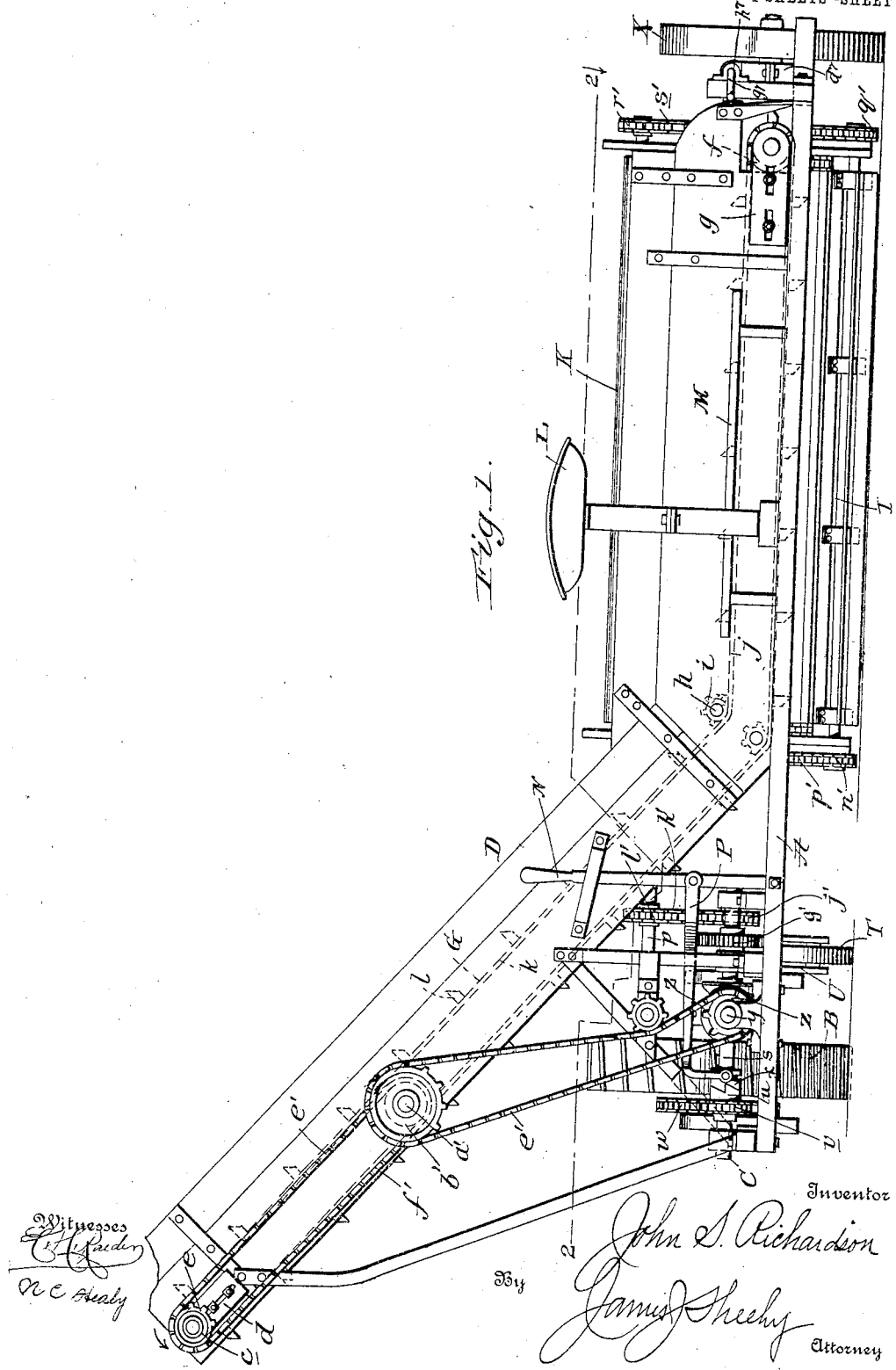

No. 810,380. PATENTED JAN. 16, 1906.
J. S. RICHARDSON.
BUNDLE LOADER.
APPLICATION FILED DEC. 8, 1903. RENEWED SEPT. 19, 1904. 4 SHEETS—SHEET 1.

Witnesses

Inventor
John S. Richardson
By
James Sheehy
Attorney

No. 810,380.   PATENTED JAN. 16, 1906.
J. S. RICHARDSON.
BUNDLE LOADER.
APPLICATION FILED DEC. 8, 1903. RENEWED SEPT. 19, 1904.
4 SHEETS—SHEET 2.
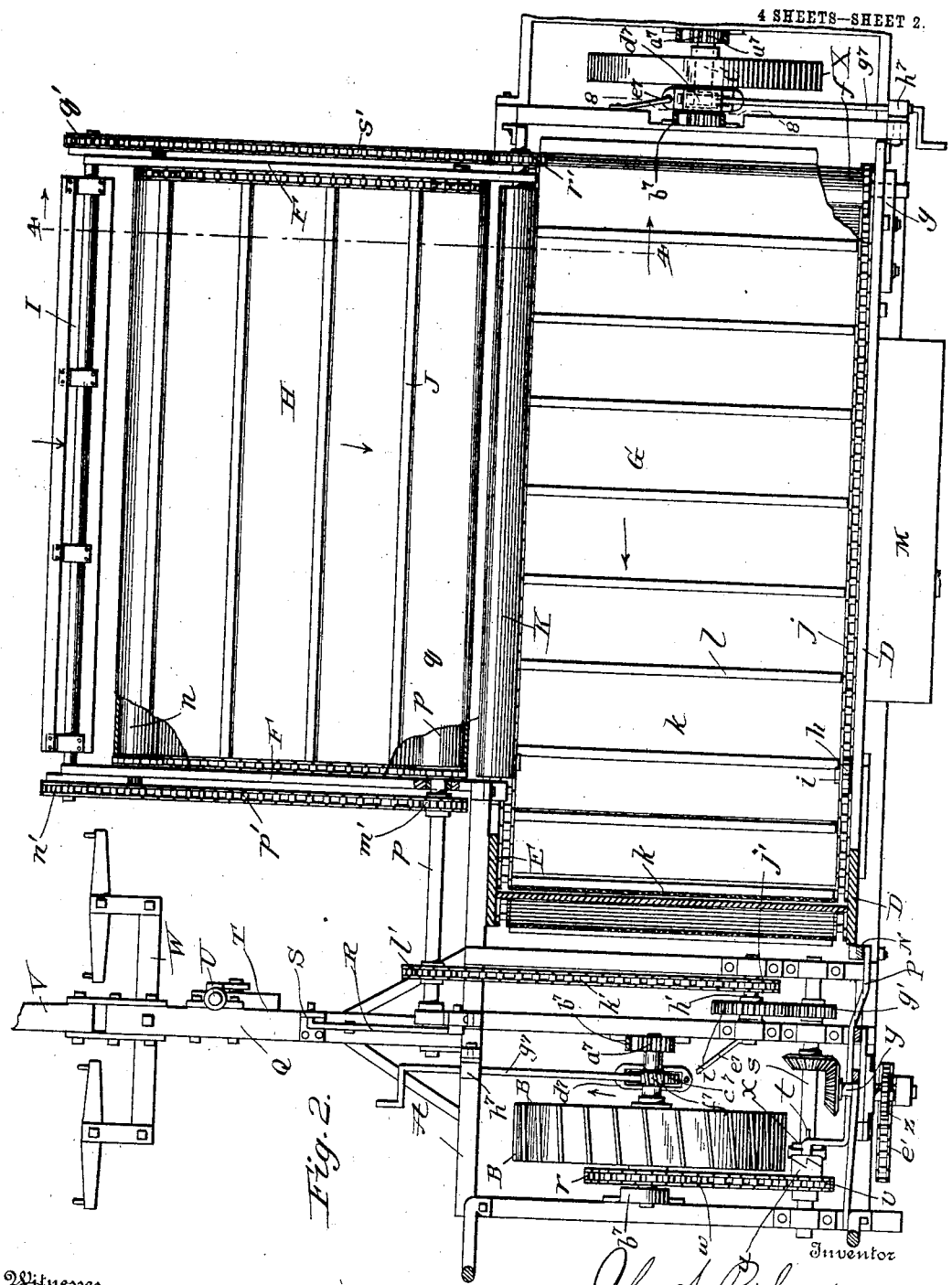

No. 810,380. PATENTED JAN. 16, 1906.
J. S. RICHARDSON.
BUNDLE LOADER.
APPLICATION FILED DEC. 8, 1903. RENEWED SEPT. 19, 1904.
4 SHEETS—SHEET 3.
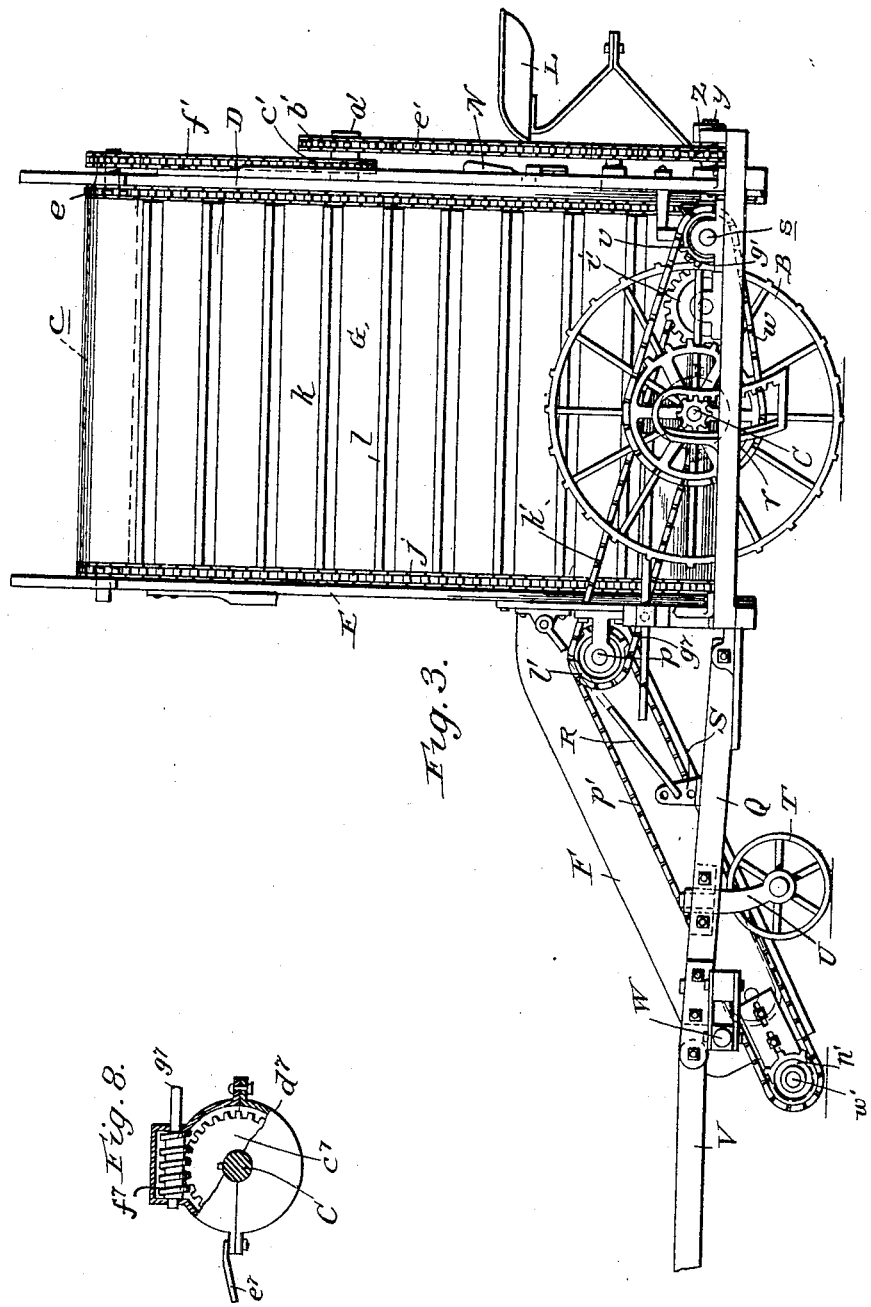

No. 810,380. PATENTED JAN. 16, 1906.
J. S. RICHARDSON.
BUNDLE LOADER.
APPLICATION FILED DEC. 8, 1903. RENEWED SEPT. 19, 1904.
4 SHEETS—SHEET 4.
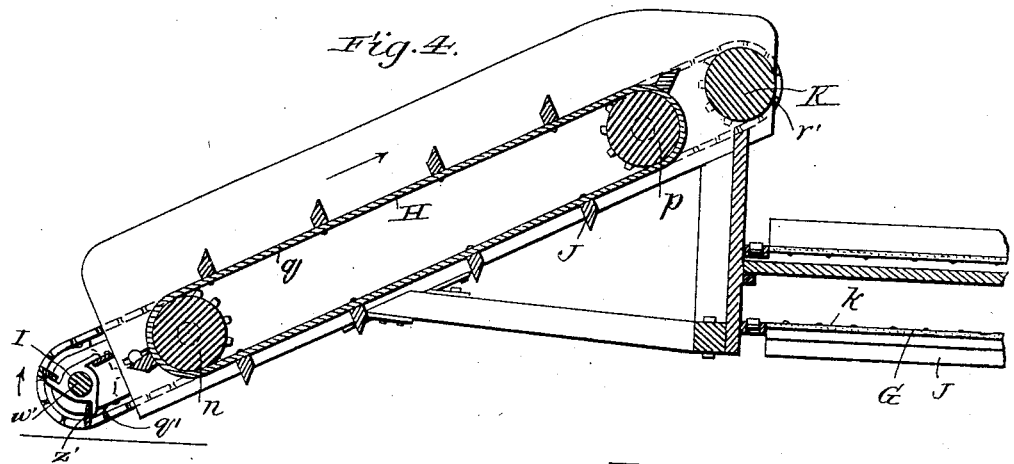
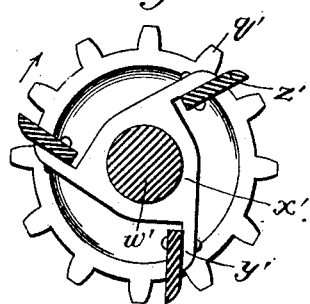
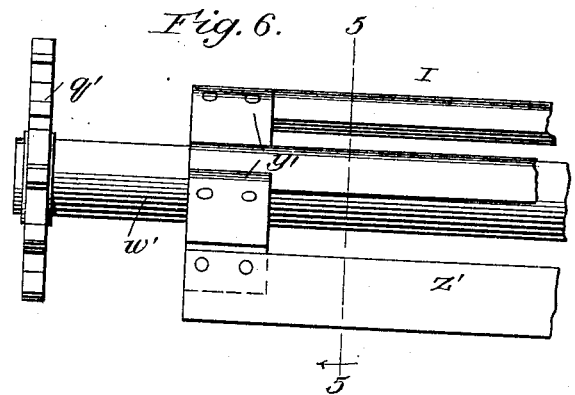
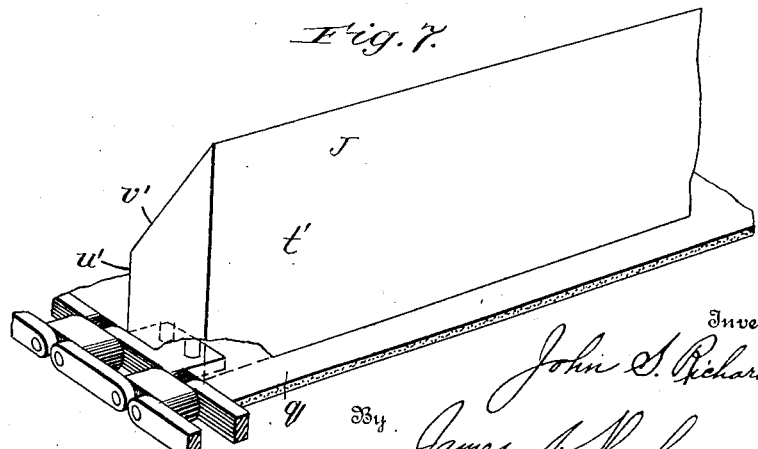
Witnesses
Inventor
John S. Richardson
By James J. Sheehy
Attorney

UNITED STATES PATENT OFFICE.

JOHN S. RICHARDSON, OF NOWESTA, NORTH DAKOTA, ASSIGNOR TO WALTER GREGORY, TRUSTEE, OF MINNEAPOLIS, MINNESOTA.

BUNDLE-LOADER.

No. 810,380.     Specification of Letters Patent.     Patented Jan. 16, 1906.

Application filed December 8, 1903. Renewed September 19, 1904. Serial No. 224,961.

*To all whom it may concern:*

Be it known that I, JOHN S. RICHARDSON, a citizen of the United States, residing at Nowesta, in the county of Pembina and State of North Dakota, have invented new and useful Improvements in Bundle-Loaders, of which the following is a specification.

My invention pertains to bundle-loaders—*i. e.*, machines adapted to take bundles or sheaves of grain from the ground and deliver the same to a wagon or rack moved at the side of the machine.

The object of the invention is to provide a bundle-loader which, while simple and sturdy in construction, is adapted to be readily adjusted to meet different conditions and is highly efficient in operation.

The invention will be fully understood from the following description and claims when taken in connection with the accompanying drawings, forming part of this specification, in which—

Figure 1 is a rear elevation of the machine constituting the preferred embodiment of my invention; Fig. 2, a section of the same, taken on the line 2 2 of Fig. 1; Fig. 3, an elevation of the left side of the machine; Fig. 4, a detail section, taken in the plane indicated by the line 4 4 of Fig. 2, looking in the direction indicated by arrows and illustrating the apron for conveying bundles or sheaves of grain from the rotary pick-up to the endless elevator; Fig. 5, a transverse section of the rotary pick-up, taken in the plane indicated by the line 5 5 of Fig. 6; Fig. 6, a detail front elevation of a portion of the rotary pick-up; Fig. 7, an enlarged detail perspective view of a portion of the endless apron intermediate of the pick-up and the endless elevator, and Fig. 8 an enlarged section on line 8 8 of Fig. 2.

Similar letters of reference designate corresponding parts in all of the views of the drawings, referring to which—

A is the main frame of the machine, which may be of any construction suitable to the purposes of the invention.

B is a traveling drive-wheel carried by a shaft C, mounted, preferably, in the adjustable manner common to harvesters in the main frame adjacent to the left-hand side thereof.

D is a wind-board fixedly connected to the main frame and having a horizontal portion (best shown in Fig. 1) and an inclined portion.

E is an inclined wind-board fixedly connected to the main frame and arranged parallel to the inclined portion of the board D.

F F are inclined wind-boards connected to and extending forwardly and downwardly from the main frame.

G is an endless bundle-elevator arranged between the wind-boards D and E, H an apron arranged between the wind-boards F, and I a rotary pick-up carried by the wind-boards F, at the forward ends thereof, and forming, with the apron H, the mechanism by which the bundles are picked up from the ground and transferred to the elevator G. The bundle-elevator G is preferably made up of an upper roller $c$, mounted in adjustable bearings $d$ at the upper ends of the wind-boards D E and bearing a sprocket-wheel $e$; a lower roller $f$, journaled in adjustable bearings $g$ at the opposite ends of the wind-boards with reference to the roller $c$; intermediate shafts $h$, bearing sprocket-wheels $i$; sprocket-belts $j$, taking around sprocket-wheels on the rollers or shafts $c f$ and under the intermediate sprocket-wheels $i$, and an apron $k$, connected to and movable with the sprocket-belts $j$ and bearing slats $l$. The apron H preferably comprises upper and lower rollers or shafts $n$ $p$, journaled in the wind-boards F and bearing sprocket-wheels, sprocket-belts arranged on said wheels, a belt $q$, of canvas or other suitable material, connected to and movable with said sprocket-belts, and transverse slats J, borne by said canvas belt.

Intermediate of the traveling drive-wheel B, which is loose on shaft C, and the endless elevator G is a driving connection made up of the following elements, viz: a sprocket-wheel $r$, fixed to wheel B; a shaft $s$, having a feather $t$; a clutch member $u$, loose on said shaft and bearing a sprocket-wheel $v$; a sprocket-belt $w$, connecting the wheels $r$ and $v$; a clutch member $x$, engaging the feather of and movable lengthwise on shaft $s$, so as to be placed in engagement with and disengaged from the complementary clutch member $u$; a shaft $y$, disposed at right angles to and connected by miter-gears with the shaft $s$; a sprocket-wheel $z$ on said shaft $y$; a short shaft $a'$, journaled in the wind-board D and bearing sprocket-wheels $b'$ $c'$, Fig. 3; a sprocket-belt $e'$, connecting the sprocket-wheels $b'$ and $z$, and a sprocket-belt $f'$, connecting the sprocket-wheel $c'$ and the sprocket-wheel $e$ on the upper roller or shaft $c$. In virtue of this construction it will be observed that when the machine is drawn forwardly the endless elevator G will be driven in the direction indicated by the large arrow in Fig. 2.

The apron H is driven by the shaft C through the medium of the connections between said shaft and the shaft $s$, a spur-gear $g'$ on said shaft $s$, a short shaft $h'$, bearing a spur-gear $i'$, intermeshed with the spur-gear $g'$ and also bearing a sprocket-wheel $j'$ and a sprocket-belt $k'$, connecting the sprocket-wheel $j'$, and a sprocket-wheel $l'$ on the upper shaft or roller $p$ of apron H. Because of this driving connection the apron H will obviously be driven in the direction of the large arrow thereon when the machine is in motion.

The rotary pick-up I is driven in the direction indicated by the arrow thereon through the medium of a sprocket-wheel $m'$ on the shaft $p$, a sprocket-wheel $n'$ on the shaft of said pick-up, and a sprocket-belt $p'$, connecting said wheels $m'$ and $n'$.

K, Figs. 2 and 4, is a roller journaled in the upper portions of the wind-boards F and about the proportional distance illustrated above the upper end of the apron H. This roller is driven from the shaft of the pick-up I through the medium of a sprocket-wheel $q'$ on the shaft of the pick-up, a sprocket-wheel $r'$ on the shaft or trunnion of the roller, and a sprocket-belt $s'$, connecting said wheels $q'$ and $r'$.

As best shown in Figs. 4 and 7 of the drawings, the slats J of the apron H are of peculiar form in cross-section, in that they have forward sides $t'$, disposed at right angles to the belt $q$, and rear sides $u'$, the outer portions $v'$ of which are beveled, as illustrated. In virtue of the said peculiar form of the slats J it will be seen that they are adapted to regularly and speedily convey the bundles of grain as they receive the same from the pick-up I to the elevator G.

The pick-up I comprises a shaft $w'$, four (more or less) brackets $x'$, fixed on said shaft and having arms $y'$, disposed tangentially to the shaft, and blades $z'$, carried by said arms of the bracket and having for their purpose to take bundles of grain from the ground and discharge the same upon the flat forward sides of the apron-slats J. The tangential disposition of the said blades $z'$ with respect to the shaft, so that they incline forwardly in the direction of their movement, is materially advantageous, since by reason of such disposition the blades may be depended on to raise each bundle that they engage and carry the same up and back and deposit it on the flat forward side of one of the slats J.

The roller K has for its purpose to prevent the bundles of grain after they are placed on the elevator G from returning to the apron H, and when rotated, as described, it will obviously preclude such retrograde movement of the bundles.

I employ the blades shown for the purpose of lifting the bundles in preference to the separated teeth or fingers heretofore employed, because the blades do not become entangled with the grain and discharge the same freely notwithstanding their forward inclination.

L is a driver's seat fixed to and located at the rear of the main frame A, M a stepping-board for enabling the driver to readily take and leave the seat, and N, Fig. 1, a hand-lever fulcrumed on the main frame within convenient reach of the driver when he occupies the seat L. The said lever N is connected by a link P with the movable clutch member $x$ on the shaft $s$, and hence it will be seen that the driver is enabled at will to stop and start not only the elevator G and the apron H, but also the pick-up I and the roller K while the machine is in motion.

Q, Figs. 2 and 3, is a bar pivotally connected to the forward side of the main frame and designed to be held in various positions with respect thereto through the medium of a rod R, pivotally connected to the frame and adapted to be placed in engagement with different apertures of a standard S, rising from the bar; T, a traveling wheel carried by a hanger U, swiveled in the bar Q and adapted to support said bar, and hence the forward side of the main frame, and V a pole or tongue connected, preferably in a pivotal manner, to the forward end of the bar Q and adapted to enable draft-animals to guide the machine. The doubletree W, to which the draft-animals are hitched, is carried by the bar Q, and in virtue of this and the employment of the wheel T to support said bar it will be observed that the draft-animals are enabled to easily guide and turn the machine and at the same time all weight of the machine is removed from the draft-animals.

In the practical operation of my novel machine the same is drawn over the field from which the bundles of grain are to be taken, and a rack or wagon to receive the bundles of grain is moved at the left-hand side of the machine—i. e., is moved along in position below the discharge end of the elevator G. When the machine is drawn over the field as stated, it will be observed that the pick-up I will raise each bundle as it comes to the same and carry it upwardly and discharge it on the forward side of one of the slats J of the apron H. This latter in turn will carry the bundles up to and discharge them over the roller K and on the elevator G, which will carry the bundles laterally upward and discharge them into the rack or wagon before mentioned.

In order that the machine may be readily raised or lowered to suit the character of the ground on which it is to be used, I prefer to adjustably mount one side of the frame in an adjustable manner on the wheel B, as before stated, and the other side of the machine in a similar manner on a wheel X. The shafts on which the said wheels are loosely mounted are provided at their ends with pinions $a^7$, intermeshed with racks $b^7$, fixed to and rising from the frame. Each of said shafts is also provided with a worm-wheel $c^7$, which is splined or otherwise fixed thereon and is inclosed in a case $d^7$, connected through the medium of a swinging rod $e^7$ with the main frame. Also carried by the cases $d^7$ are worm-screws $f^7$ on shafts $g^7$, which shafts are journaled in the cases $d^7$ and in bearings $h^7$, pivoted on the frame, and are provided at their outer ends with cranks, as shown. When either of the said shafts $g^7$ is turned through the medium of its crank, the worm-wheel $c^7$ complementary thereto will be turned and the adjacent side of the main frame raised or lowered, according to the direction of rotation of the crank-shaft.

Notwithstanding the advantages of my novel machine as pointed out in the foregoing it will be observed that the construction of the machine is simple and inexpensive, also that the said construction is sturdy, and hence well adapted to withstand the rough usage to which bundle-loaders are ordinarily subjected.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a bundle-loader, the combination of an elevator, means for picking bundles up from the ground, and an endless apron arranged to receive from said means and discharge to the elevator, and comprising slats having forward sides disposed at right angles to its stretches, and also having rear sides the outer portions of which are beveled.

2. In a bundle-loader, the combination of an elevator, means for picking bundles up from the ground, an endless apron arranged to receive from said means and discharge to the elevator, a roller intermediate of the apron and the elevator for preventing the return of bundles from the latter to the former, and means for driving the apron and said roller.

3. A bundle-loader having a horizontal, rotary pick-up provided with blades disposed tangentially to its axis.

4. In a bundle-loader, a pick-up comprising a rotary shaft, brackets on said shaft, having arms disposed tangentially with respect to the shaft, and blades carried by said arms of the brackets and arranged parallel to the shaft.

5. In a bundle-loader, the combination of an elevator, a rotary pick-up comprising a shaft, and blades disposed tangentially with respect to the shaft, and an endless apron arranged to receive from the pick-up and discharge to the elevator, and comprising slats having forward sides disposed at right angles to its stretches, and also having rear sides the outer portions of which are beveled.

6. In a bundle-loader, the combination of a main frame, a traveling drive-wheel, an endless elevator, a rotary pick-up disposed at right angles to the elevator, an endless apron arranged to receive from the pick-up and discharge to the elevator, driving connections intermediate of the drive-wheel and the elevator, pick-up and apron, and means comprised in said connections for throwing the elevator, pick-up and apron into and out of operation.

7. In a bundle-loader, the combination of a main frame, a traveling drive-wheel carried thereby, an endless elevator, a rotary pick-up disposed at right angles to the elevator, an endless apron arranged to receive from the pick-up and discharge to the elevator, a roller arranged intermediate of the apron and the elevator for preventing the return of bundles from the latter to the former, and driving connections intermediate of the drive-wheel and the elevator, pick-up, apron and roller.

8. In a bundle-loader, the combination of an elevator, a rotary pick-up disposed at an angle to the elevator and comprising a shaft and blades connected with and disposed tangentially to the shaft, an endless apron arranged to receive from the pick-up and discharge to the elevator, and comprising slats having forward sides disposed at right angles to its stretches, and also having rear sides, the outer portions of which are beveled, a roller intermediate of the discharge end of the apron and the elevator for preventing the return of bundles from the latter to the former, and means for driving the elevator, the pick-up, the apron and the roller.

9. The combination in a bundle-loader, of a main frame, a bar pivotally connected to the main frame, and carrying a doubletree or other suitable draft apparatus, a traveling wheel supporting said bar, and carried by a hanger pivotally connected to the bar so as to turn on its axis, a pole connected to said bar, and an adjustable connection between the main frame and the bar.

10. The combination in a bundle-loader, of a main frame, a bar pivotally connected to the main frame, and having an upright provided with a plurality of apertures, a doubletree or similar draft apparatus carried by the bar, a traveling wheel supporting the bar, and carried by a hanger pivoted to the bar so as to turn on its axis, a rod pivoted to the frame, and having an angular portion adapted to engage the apertures of the upright, and a pole pivoted to the bar.

11. In a bundle-loader, the combination with a horizontally-disposed, rotary pick-up adapted to be moved at a slight distance above the ground, and comprising blades disposed tangentially to its axis, and means for rotating said pick-up; of a conveyer arranged to receive bundles from the pick-up.

12. In a bundle-loader, the combination with a main frame suitably supported on carrying-wheels, of an endless elevator and means armed with long blades adapted to be entered under the bundles and to deliver them from the ground to said elevator.

13. In a bundle-loader, the combination with an endless elevator suitably sustained and carried upon a supporting-frame and wheels, of a rotary pick-up device armed with long blades adapted to be entered under the bundles and to deliver the bundles to said elevator.

14. In a bundle-loader, the combination, with a main frame and a traveling drivewheel, of an endless conveyer carried and operated thereby and arranged to receive the bundles and deliver them upon the wagon, and means armed with long blades for picking up the bundles and depositing them upon the said elevator.

15. In a bundle-loader, the combination with an endless elevator suitably sustained and carried upon a supporting-frame and wheels, of a pick-up mechanism armed with long blades adapted to pick up the bundles and deliver them to the said elevator.

16. A bundle-loader having in combination an elevator for conveying the bundles to the wagon, and a horizontally-arranged pick-up mechanism for transferring the bundles to the elevator, such pick-up mechanism comprising a series of blades moving a slight distance above the ground and projecting forwardly in the direction of their movement so as to adapt them to lift the bundles from the ground.

17. The bundle-loader having in combination an elevator arranged transversely of the line of draft so as to adapt it to deliver bundles into a wagon located at the side of the loader, and a horizontal pick-up mechanism consisting of a series of blades moving in the direction of the draft and a slight distance above the ground and adapted to deliver the bundles to said elevator, a framework supporting said elevator and pick-up mechanism, and carrying and driving wheels.

18. A bundle-loader having in combination an elevator arranged across the line of draft and having one end lifted so as to adapt it to deliver the bundles into a wagon located at the side of the loader, a frame for supporting said elevator, driving and carrying wheels upon which the frame is mounted and from which the elevator is driven, a pick-up mechanism extending across the line of draft and having blades moving in line with the draft and acting to lift the bundles from the ground and deliver them to said elevator, and draft devices attached to said elevator-frame at one side of the pick-up mechanism.

In testimony whereof I have hereunto set my hand in presence of two subscribing witnesses.

JOHN S. RICHARDSON.

Witnesses:
T. A. MILLER,
T. E. TURPIN.